United States Patent Office 3,227,701
Patented Jan. 4, 1966

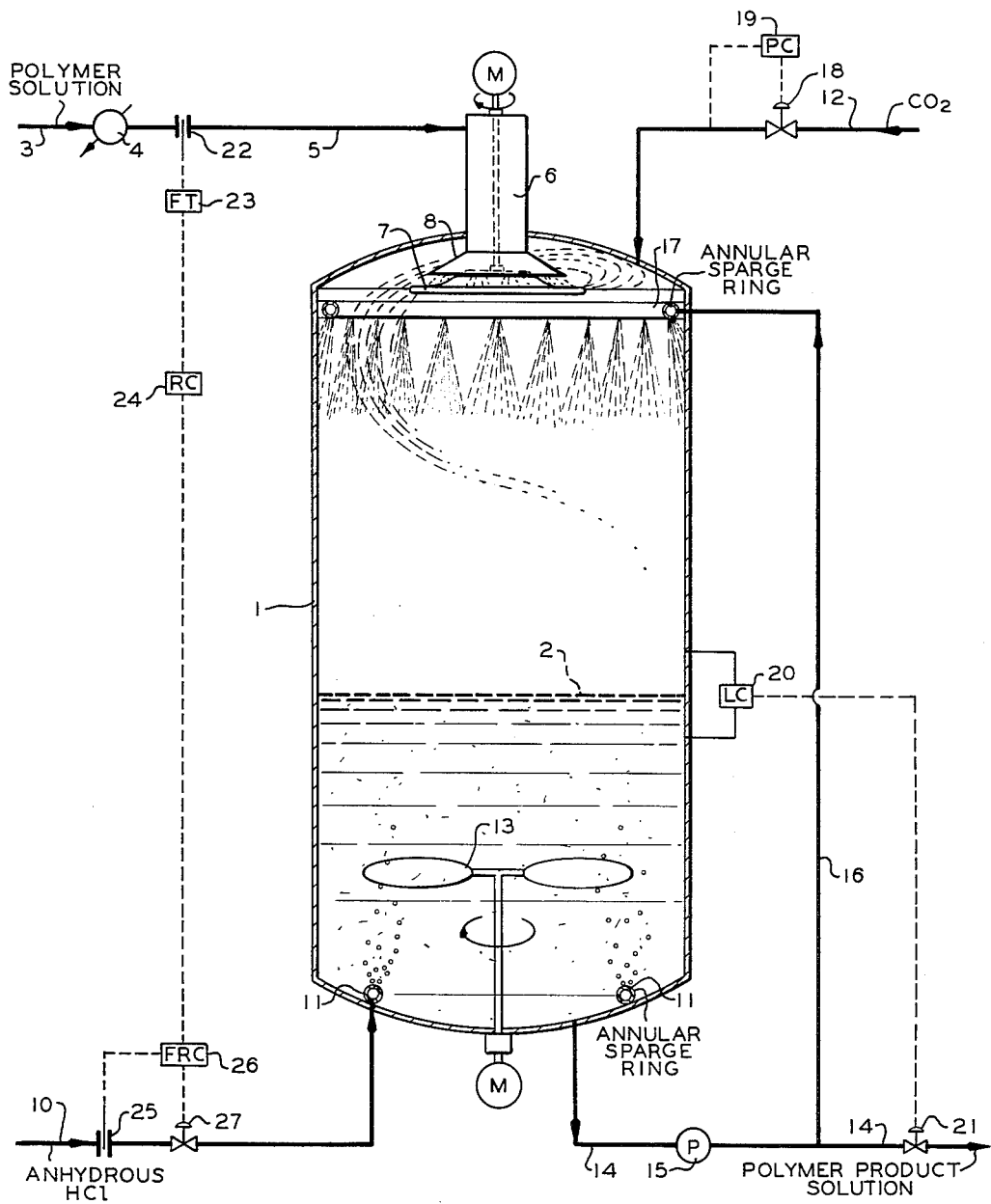

3,227,701
CARBOXYLATION AND ACIDIFICATION OF POLYMERS
Edward N. Pennington, Bartlesville, Okla., assignor to Phillips Petroleum Company, a corporation of Delaware
Filed May 29, 1962, Ser. No. 198,637
7 Claims. (Cl. 260—94.7)

This invention relates to carboxylation and acidification of polymers. In one of its aspects, the invention relates to carboxylation and acidification of a diene polymer solution in a single zone. In another aspect, the invention relates to process and apparatus for carboxylation and acidification of a diene polymer solution wherein the polymer solution is introduced into a carboxylating atmosphere and then into a body of liquid polymer solution into which is introduced an acidification medium. In still another aspect, the invention relates to process and apparatus for carboxylation and acidification of a polymer solution in a single zone wherein the polymer solution is first contacted in finely divided form with a carboxylation medium and then collected into a liquid body wherein it is contacted with acidification medium and wherein the walls of the reaction zone are washed with a portion of the product to prevent accumulation of polymer thereon.

In the preparation of carboxy-telechelic polymers, a solution of polymer having terminal metal atoms thereon is treated with a carboxylation or carbonation agent such as carbon dioxide. The terminal metal atoms are then generally replaced by acidifying the polymer solution, resulting in a terminal acid group. It has been found that carbonation of such polymer solutions increases the solution viscosity, often to the point that these solutions are extremely difficult to handle. However, after replacement of the terminal metal atom with a hydrogen atom, there results a free-flowing liquid.

Accordingly, it is an object of this invention to provide process and apparatus for carbonation and acidification of polymer solutions wherein there is avoided the problem of handling a highly viscous solution. It is another object of this invention to provide process and apparatus for carbonation and acidification of polymer solution in a single zone.

Other aspects, objects and the several advantages of this invention will become apparent upon study of this disclosure, the drawing, and the appended claims to the invention.

According to the invention, there are provided process and apparatus for carboxylation and acidification of a polymer of a conjugated diene in a single zone which comprises:

(a) maintaining in an upper portion of the zone a gaseous atmosphere comprising carbon dioxide,
(b) maintaining in a lower portion of the zone a solution of the carboxylated polymer,
(c) introducing into the upper portion of the zone in finely divided form a solution of the polymer,
(d) introducing into the lower portion of the zone an acidifying agent, and
(e) withdrawing from a lower portion of the zone as product a solution of the now carboxylated polymer.

The drawing represents in schematic form a presently-preferred embodiment of the apparatus of this invention.

Referring now to the drawing in detail, it is seen that there is provided a reaction vessel 1 in which there is maintained a liquid level, generally indicated as 2. A solution of the polymer to be treated is passed by way of conduit 3 to cooler 4, wherein its temperature can be adjusted, and, thence, by way of conduit 5, to a dispersing apparatus generally indicated as 6. This dispersing apparatus can comprise a housing with motor-driven rotating disc 7. Baffle members 8 are immovably mounted to the housing and are disposed above the rotating plate so as to aid in the breaking of the polymer particles. The function of this dispersing apparatus is to introduce the polymer solution into the gaseous atmosphere maintained above liquid level 2 in a finely divided form in order to increase contacting and reacting efficiency. Acidifying agent is passed by way of conduit 10 to a distributor means, such as annular sparge ring 11, located in a lower portion of the vessel. Carbonation medium, such as a gaseous carbon dioxide stream, is introduced into an upper portion of the vessel by way of conduit 12. The vessel is preferably provided with means to agitate the liquid phase, such as motor-driven agitator 13. Treated product polymer solution is removed from a lower portion of the vessel by way of conduit 14 and pump 15 to further utility. In order that polymer does not accumulate upon the walls of the upper portion of the vessel, it is presently preferred that a portion of the treated product removed by way of conduit 14 be returned by way of conduit 16 to wash the inner vessel walls. This can be accomplished, for example, by use of an annular sparge ring 17. Pressure in the reaction vessel can be maintained at a predetermined value by provision of motor valve 18 and its associated pressure controller 19. Liquid level can be maintained constant by liquid level controller 20 and its associated motor valve 21 in conduit 14, which coact to regulate rate of product withdrawal. Rate of introduction of the acidifying medium is preferably controlled in the following manner. Flow rate of introduced polymer solution is measured by such as orifice plates 22 in conduit 5 and its associated flow transmitter 23; this transmitter produces a signal proportional to flow rate which is passed to ratio controller 24. Flow rate of the acidifying medium in conduit 10 is measured by such as orifice plate 25; a signal proportional to this flow rate is passed to controller 26. Ratio controller 24 and flow controller 26 then coact to produce a signal passed to motor valve 27, and adjust this valve so as to maintain a constant ratio of flow in conduits 5 and 10.

The term "telechelic" has been coined to define the terminally reactive polymers of this invention. As used in this specification and in the claims, telechelic polymers means polymers of vinylidene-containing monomers which contain a reactive group on each end of the polymer molecule. Such polymers can be prepared by various methods including polymerization of vinylidene-containing monomers in the presence of an organo alkali metal catalyst. This invention is concerned only with those telechelic polymers which contain terminal carboxy groups, to be designated as "carboxy-telechelic" polymers.

The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The polymers used in my invention are prepared by contacting the monomer with an organo alkali metal compound. While compounds containing only one alkali metal atom per molecule, such as n-butyl lithium are suitable and will produce mono-terminally reactive polymer, that is polymer containing a reactive group on only one end of the polymer chain, it is preferred that an organo polyalkali metal compound be employed, for example, containing 2 to 4 alkali metal atoms. Initiators containing 2 alkali metal atoms are more frequently employed, and, as will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared. The general reaction can be illustrated graphically as follows:

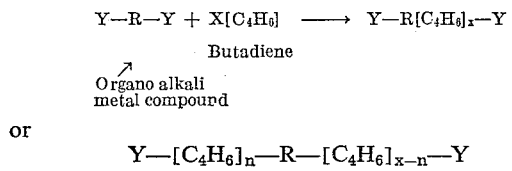

or $$Y—[C_4H_6]_n—R—[C_4H_6]_{x-n}—Y$$

or combinations thereof.

A specific example is:

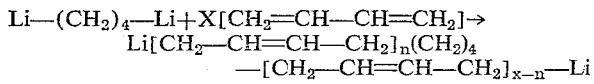

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive polymer, that is, polymer having alkali metal at only one end of the chain is substantially higher. The alkali metals, of course, include sodium, potassium, lithium, rubidium and cesium. The organic radical of the organo polyalkali metal compound can be aliphatic, cycloaliphatic or aromatic radical.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 1000 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffin, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures.

The polymer thus formed is in solution in one of the above-mentioned solvents. This solution can be reacted directly with carbon dioxide according to my invention. It is sometimes desirable to dilute or concentrate the solution in order to obtain the best viscosity conditions for the carbonation step. The most desirable polymer concentration depends upon the molecular weight of the polymer and the type of polymer and can readily be determined. Extremely dilute solutions can be treated but practical considerations concerning the handling of large quantities of solutions make it desirable to use solutions containing at least about 3 weight percent polymer. As explained above, the molecular weight of the polymer can range from 1,000 to 150,000 or higher, although usually liquid polymers having molecular weights less than 20,000 are employed. The concentration of the polymer in solution ordinarily is not over 20 weight percent.

In the prior art process for carbonating diene polymers it has been found necessary to use carbon dioxide in substantial excess of stoichiometric amounts required. By the process of my invention, I have found the need for excessive carbon dioxide is substantially eliminated and only that actually used in the carbonating reaction is introduced into the process.

The temperature of the carbonation reaction should be maintained below 60° F. and preferably at about 40° F. or below. This temperature is best obtained by cooling the solution to about —60 to 60° F. and preferably below 40° F. before introducing it into the reactor.

The polymer is then treated with a suitable reagent, such as an acid, to convert the metal salt groups to carboxy groups. Any material containing an active hydrogen more reactive than the hydrogen of the carboxy group can be used for this replacement. Generally, a dilute inorganic acid, such as hydrochloric, phosphoric, or sulfuric acid is most suitable.

The products can be used as adhesives, potting compounds, sealants, tread stocks and for many types of molded objects. Since the polymers which contain terminal acidic groups adhere to metal surfaces, partially reacted polymers are valuable in the production of laminates in which one or more of the plies are metal. Advantages of this invention are illustrated by the following examples. The reactants, and their proportions, and other specific conditions are presented as being typical and should not be construed to limit the invention unduly.

*Example 1*

1,3-butadiene was polymerized in accordance with the following recipe:

| | Parts by weight |
|---|---|
| 1,3-butadiene | 100 |
| Toluene | 860 |
| 1,2-dilithio-1,2-diphenylethane ____(30 mmols.) | 5.82 |
| Temperature, ° F. | 122 |
| Time, hours | 1 |

Three runs were made. Polymerization was effected in 12-ounce bottles. Toluene was charged first, after which the bottles were purged with prepurifiied nitrogen for 5 minutes at the rate of 3 liters per minute. Butadiene was introduced followed by the 1,2-dilithio-1,2-diphenylethane.

The initiator employed in the foregoing polymerizations was prepared in accordance with the following recipe:

| | |
|---|---|
| Diethyl ether, ml. | 130 |
| Tetrahydrofuran, ml. | 70 |
| Trans-stilbene (1,2-diphenylethylene), mol. | 0.4 |
| Lithium wire, gram atoms | 1.2 |
| Temperature, °F. | 122 |
| Time, hours | 1 |

Concentration of the solution was 0.2 molar.

*Example II*

Butadiene was polymerized at 50° C. to quantitative conversion in one hour. The following recipe was employed.

| | |
|---|---|
| 1,3-butadiene, parts by weight | 100 |
| Cyclohexane, parts by weight | 780 |
| 1,2-dilithio-1,2-diphenylethane, millimols | 50.0 |

Polymerization was effected in a one-gallon reactor. Cyclohexane was charged first, after which the reactor was purged with prepurified nitrogen for 30 minutes at the rate of 3 cu. ft./hour. 1,2-dilithio-1,2-diphenylethane was added, the mixture was heated to 50° C., and butadiene was pressured in at 16 ml./minute. The temperature was controlled at 50° C.

*Example III*

A polymerization initiator, an adduct of lithium with trans-stilbene (1,2-dilithio-1,2-diphenylethane), was prepared in a 50-gallon glass-lined tank equipped with an agitator. The recipe for preparing this adduct was as follows:

| | Parts by weight |
|---|---|
| Trans-stilbene (1,2-diphenylethylene) | 100 |
| Lithium shot | [1] 7.8 |
| Diethyl ether | 1185 |
| Tetrahydrofuran | 165 |

[1] 50% excess added.

The diethyl ether, tetrahydrofuran, and stilbene were charged, lithium was added, and the suspension was heated to 120° F. with agitation for one hour and then cooled to room temperature.

Polymerizations were carried out in an 80-gallon reactor in accordance with the following recipe:

| | Parts by weight |
|---|---|
| 1,3-butadiene | 100 |
| Toluene | 1000 |
| 1,2-dilithio-1,2-diphenylethane | Variable |
| Polymerization temperature, °F. | 122 |
| Time, hours | 1.0 |
| Conversion, percent | 100 |

Charge order: Toluene, heat to polymerization temperature, butadiene, initiator.

When 100 percent conversion was reached, the polymerization mixture was cooled to carbonation temperature.

*Example IV*

The polymer solution prepared according to any of the methods disclosed in the above examples is introduced into the combination carbonating-acidifying vessel which has a volume of 100 gallons and is 8 feet high and 2½ feet in diameter. The carbonating-acidifying vessel is operated at 40° F. and 150 lbs. p.s.i.g. To further illustrate the advantages of this invention the following flow rates illustrating production of carboxylated polybutadiene at the rate of 5 million pounds per year are set forth.

203,369 lbs./day of polymer solution (in cyclohexane) are introduced into the vessel along with 363 lbs./day of $CO_2$ and 301 lbs./day of HCl. 204,032 lbs./day of treated solution are removed from the reaction vessel, said solution contains 15,329 lbs./day of carboxylated polymer.

By way of comparison, the prior art methods have introduced 7510 lbs./day of $CO_2$ as well as 602 lbs./day of HCl. Of the 7510 lbs./day of $CO_2$ which is introduced only 363 pounds is actually used in the carbonating reaction. The rest of the $CO_2$ which is not used in the reaction must be vented from the system and lost.

The control instruments described in this invention are conventional and well known. Exemplary of these are the model R776F flow transmitter and the model R–463 ratio controller manufactured by General Precision Company and described in their general catalogue of 1959. The model 40 pneumatic controller manufactured by the Foxboro Company and described in Foxboro Bulletin #450 may be used for the pressure, liquid level and flow controllers necessary in this invention.

Reasonable variation and modification are possible within the scope of this disclosure, the drawing and the appended claims to the invention, the essence of which is that there have been provided process and apparatus for carboxylation and acidification of a polymer solution in a unitary zone, as described.

I claim:

1. In the process of carboxylating and acidifying a solution of conjugated diene polymer wherein carboxylation causes an increase in viscosity of the solution and wherein acidification of the thus-carboxylated solution effects a decrease in solution viscosity, the improvement comprising effecting both the carboxylation and the acidification in a single zone wherein there is maintained a gaseous atmosphere comprising carbon dioxide above a liquid body comprising an alkali metal terminated polymer solution, the carboxylation and acidification being effected in the following steps:

(a) introducing a solution of an alkali metal terminated conjugated diene polymer into the gaseous atmosphere of said zone in a finely divided form, (b) introducing an acidifying agent into the liquid body of said zone, (c) withdrawing as product from said zone a solution of carboxylated and acidified polymer, and (d) replacing said gaseous atmosphere comprising carbon dioxide.

2. The process of claim 1 wherein a portion of the product withdrawn in step (c) is returned to said zone in a manner effective to wash the internal boundaries of the gaseous atmosphere portion of said zone.

3. A process for carboxylation and acidification of polymer of a conjugated diene in a single zone which comprises:

(a) maintaining in an upper portion of said zone a gaseous atmosphere comprising carbon dioxide, (b) maintaining in a lower portion of said zone a solution of an alkali metal terminated carboxylated polymer, (c) introducing into the upper portion of said zone in finely divided form a solution of said polymer, (d) introducing into the lower portion of said zone an acidifying agent, (e) withdrawing from a lower portion of said zone as product a solution of the carboxylated and acidified polymer, and (f) returning a portion of the thus-withdrawn product solution to said zone in a manner effective to wash down interior bounds of an upper portion of said zone.

4. The process of claim 3 wherein said polymer comprises an alkali metal terminated polybutadiene and said acidifying agent comprises anhydrous hydrogen chloride.

5. The process of claim 4 further comprising the steps of:

(g) producing a first signal proportional to the rate of introducing of step (c), (h) producing a second signal proportional to the rate of introducing of step (d), (i) producing a third signal proportional to the ratio of said first to said second signal, (j) regulating the introducing of step (d) in response to said third signal so as to maintain said third signal at a predetermined value, and (k) regulating the withdrawing of step (e) so as to maintain a relatively constant volume of liquid in said zone.

6. A process for carboxylation and acidification of a solution of an alkali metal terminated butadiene polymer which comprises:

(a) passing said solution in finely divided form into an upper portion of a reaction zone, (b) collecting solution into a body of liquid in a lower portion of said reaction zone, (c) maintaining above the collected solution an atmosphere comprising gaseous carbon dioxide, (d) introducing into the collected solution an acidifying agent comprising anhydrous hydrogen chloride, (e) removing from a lower portion of said reaction zone a portion of the collected carboxylated and acidified solution as product of the process, (f) regulating the rate of introducing in step (d) so as to maintain its ratio to that of the passing of step (a) at a predetermined value, (g) returning a portion of the removed product of step (e) to an upper portion of said reaction zone so as to wash the interior boundaries of said upper portion, and (h) regulating the removing of step (e) so as to maintain a predetermined volume of liquid in said reaction zone.

7. The process of claim 6 wherein said solution is cooled prior to the passing of step (a) sufficient to maintain the temperature in said reaction zone in the range of about $-60$ to about $60°$ F., and wherein said atmosphere comprising carbon dioxide is maintained at a pressure of about 1 to about 10 atmospheres.

References Cited by the Examiner

UNITED STATES PATENTS

| | | | |
|---|---|---|---|
| 2,838,380 | 6/1958 | Kean | 23—285 |
| 2,904,409 | 9/1959 | Bolstad | 23—285 |
| 2,991,279 | 7/1961 | Miller et al. | 260—94.7 |
| 3,062,802 | 11/1962 | Cunneen et al. | 260—94.7 |

JOSEPH L. SCHOFER, *Primary Examiner.*

LEON J. BERCOVITZ, *Examiner.*